United States Patent
Delcros

(10) Patent No.: US 7,087,199 B2
(45) Date of Patent: Aug. 8, 2006

(54) PROCESS FOR THE MANUFACTURE OF AN ARTICLE COVERED WITH A SUPPLE INSERT

(75) Inventor: Julien Delcros, Meru Cedex (FR)

(73) Assignee: Faurecia Interieur Industrie, Nanterre (FR)

( * ) Notice: Subject to any disclaimer, the term of this patent is extended or adjusted under 35 U.S.C. 154(b) by 348 days.

(21) Appl. No.: 10/629,556

(22) Filed: Jul. 30, 2003

(65) Prior Publication Data

US 2004/0094856 A1   May 20, 2004

(30) Foreign Application Priority Data

Jul. 30, 2002   (FR) .................................. 02 09685

(51) Int. Cl.
*B29C 44/06*   (2006.01)
*B29C 44/12*   (2006.01)

(52) U.S. Cl. .................. 264/46.5; 264/46.4; 264/46.6; 264/46.7

(58) Field of Classification Search ............... 264/46.4, 264/46.5, 46.6, 46.7

See application file for complete search history.

(56) References Cited

U.S. PATENT DOCUMENTS

| 5,017,115 | A |   | 5/1991 | Yanagishita et al. |
| 5,133,912 | A |   | 7/1992 | Hagiwara et al. |
| 5,643,612 | A | * | 7/1997 | Suzuki ........................ 425/125 |

FOREIGN PATENT DOCUMENTS

| DE | 24 38 367 | 2/1976 |
| EP | 0 023 194 | 1/1981 |
| JP | 9-262845 | 10/1997 |
| WO | WO 99/37473 | 7/1999 |

\* cited by examiner

*Primary Examiner*—Allan R. Kuhns
(74) *Attorney, Agent, or Firm*—Young & Thompson

(57) ABSTRACT

Process for the manufacture of an article comprising a rigid support element of which a "show" face is partially covered by a supple covering. The covering is connected to a relatively rigid holding element having its own shape and a strength such that it is not substantially deformed under predetermined foaming conditions, in order substantially to maintain the covering in a predetermined shape. Then, the covering and the support element are placed in a foaming mould, and, since the support element has a hollow region delimited by a peripheral rim, a docking surface of the covering is disposed opposite the peripheral rim. Foam is thus introduced into the mould, between the support element and the covering, under the predetermined conditions, in order to connect the covering and the support element.

17 Claims, 2 Drawing Sheets

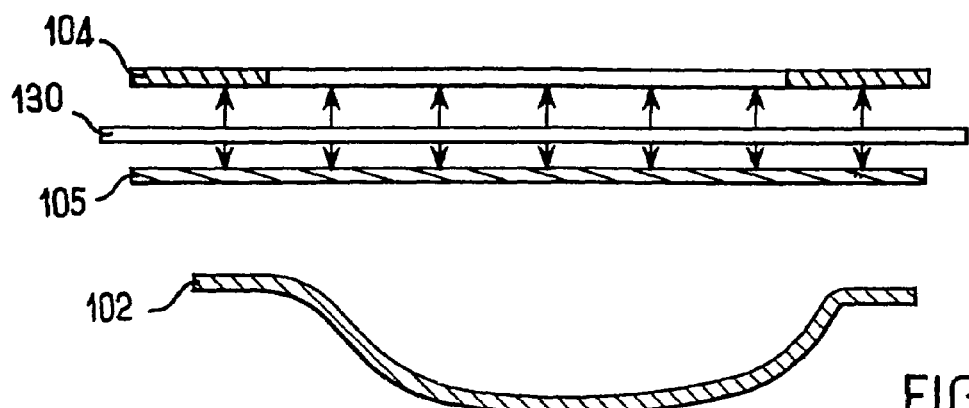
FIG_4
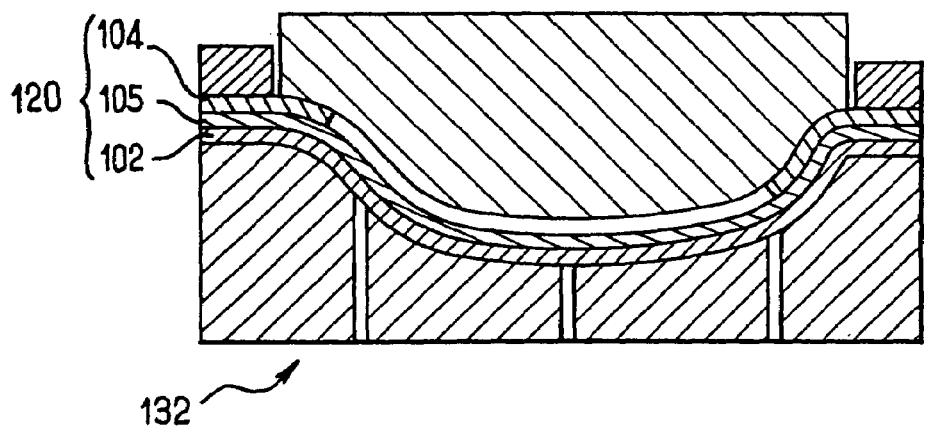
FIG_5
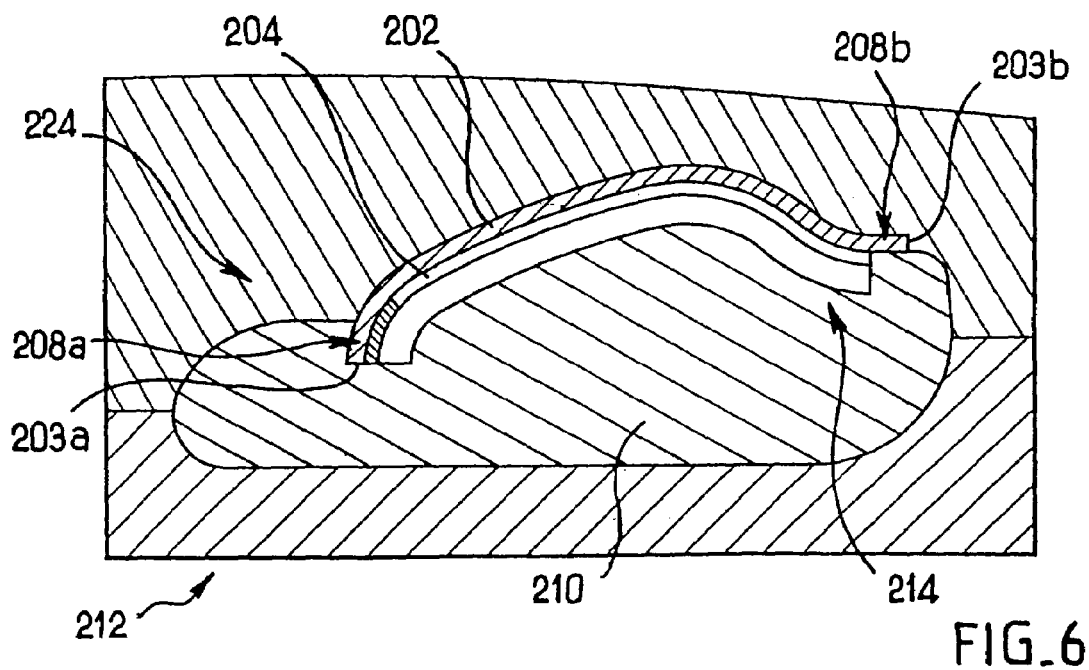
FIG_6

PROCESS FOR THE MANUFACTURE OF AN ARTICLE COVERED WITH A SUPPLE INSERT

BACKGROUND OF THE INVENTION

The invention relates to the manufacture of an article comprising a rigid support element having a "show" face of which only one portion is covered by a covering forming an insert and providing a supple feel.

Such an article is used in particular for the interior trim of a motor vehicle, especially as a dashboard or a door panel.

Processes permitting the manufacture of such articles are already known. Thus, U.S. Pat. No. 5,643,612 proposes:

placing the covering and the support element in a foaming mould and, since the support element has a hollow region delimited by a peripheral rim, disposing a docking surface of the covering opposite the peripheral rim, then introducing foam into the mould, between the support element and the covering, in order to connect the covering and the support element.

However, the applicant has realised that that process is not suitable for all types of covering. In particular, when it is not possible to thermoform the covering without impairing its aesthetic characteristics or, more generally, when the covering is not produced from a material capable of preserving a given shape, for example, when it is constituted by natural fibres (wool, cotton, . . . ) or by leather, the covering, being too supple, cannot prevent the foam from escaping between itself and the support element.

Another known process consists in laying the edge of the covering against the support element and introducing foam between the support element and the covering. That process admittedly solves the problem of sealing for all types of covering material, but, since the edge of the covering is visible after foaming, it is then necessary to cover it with an embellisher.

SUMMARY OF THE INVENTION

In order to solve those problems, the invention proposes first of all to connect the covering to a relatively rigid holding element having its own shape and a strength such that it is not substantially deformed under the foaming conditions, in order substantially to maintain the covering in a predetermined shape.

That solution is relatively simple, and therefore inexpensive and easy to implement, and it makes it possible to combine the advantages of the above-mentioned processes, namely, on the one hand, the camouflaging of at least a portion of the edge of the covering and, on the other hand, the absence of visible foam leakage between the covering and the support element.

According to an additional feature, according to the invention, the covering is connected to the holding element only locally, at the periphery of the covering.

In practice, it would in particular be possible to use a substantially annular holding element that extends only opposite the periphery of the covering.

Thus, the article preserves a supple feel over most of the covering. In addition, the weight and the cost of the article are reduced.

When the holding element is thermoformable, the invention proposes that:

simultaneously, the covering is connected to the holding element and the holding element is thermoformed, in order to confer on the covering the predetermined shape, then, the docking surface of the covering is placed opposite the peripheral edge of the support element, in the foaming mould.

As a variant, according to the invention, the holding element is manufactured substantially in accordance with the predetermined shape, and then the covering is connected to the holding element.

BRIEF DESCRIPTION OF THE DRAWINGS

The invention will emerge even more clearly from the following description which is given with reference to the appended drawings in which:

FIGS. 4 and 5 illustrate a variant of the step illustrated in FIG. 1, FIG. 6 illustrates a variant of the step illustrated in FIG. 2.

FIG. 1 shows a covering sheet 2 and a holding element 4 forming a shaper.

DETAILED DESCRIPTION OF THE PREFERRED EMBODIMENTS

Figure 1:
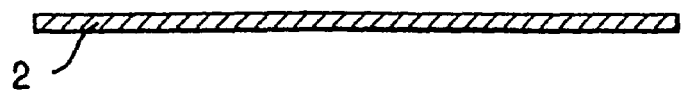
FIGS. 1 to 3 illustrate three successive steps of a process according to the invention.
Figure 1:
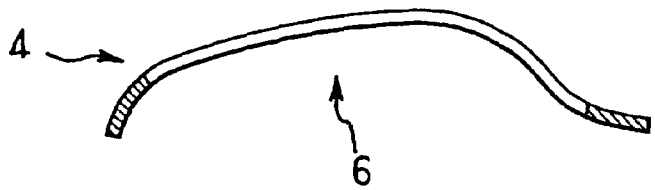

The covering sheet 2 is supple and flexible, so that it becomes deformed under the effect of its own weight. It may in particular be constituted by a leather skin, a woven material or a textile.

The relatively rigid holding element 4 has its own shape and it is advantageously obtained by moulding. It has substantially a predetermined three-dimensional shape defining a frame having a wide opening 6 at its centre. The holding element is advantageously manufactured from plastics. It could also comprise metal, wood, a mixture of those materials or other similar materials.

When the covering sheet 2 has been cut to the desired dimensions, it is secured to the holding element 4, for example by adhesive bonding, and defines with the holding element 4 a complex 20. Owing to the opening 6 formed in the frame 4, only a marginal region 8 extending at the periphery of the covering sheet 2 as far as the peripheral edge 3 is connected to the frame 4.

Figure 2:
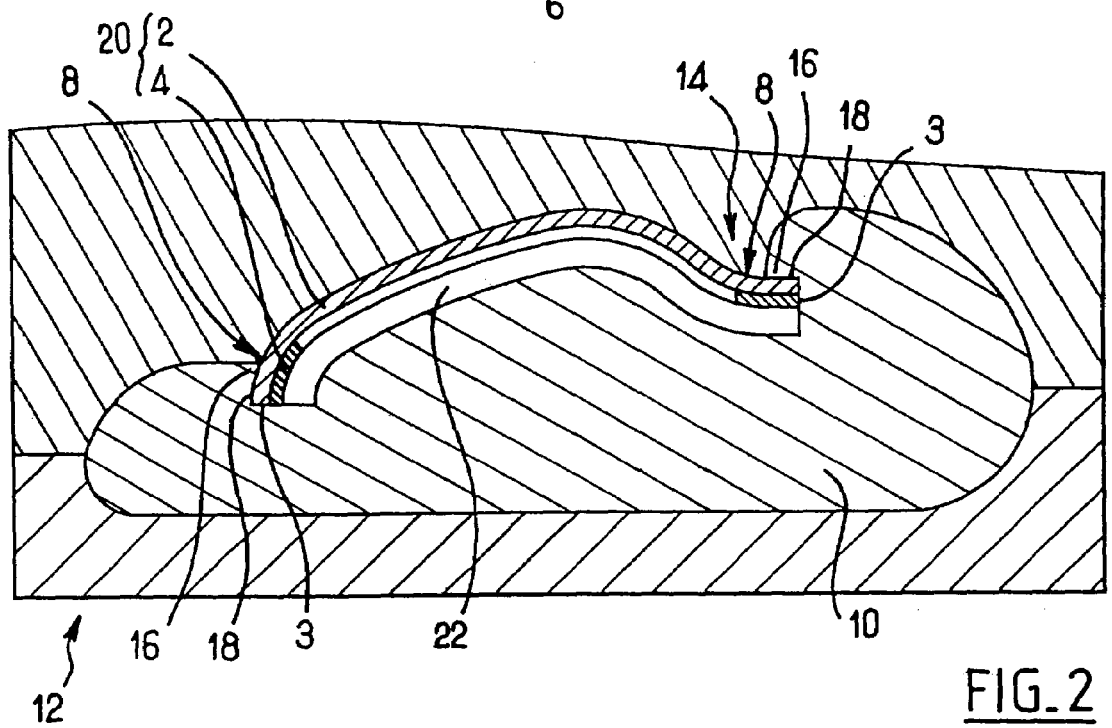

Then, as illustrated in FIG. 2, the complex as well as a support element 10 are placed in a foaming mould 12.

The support element 10, which is advantageously produced from plastics material, is rigid. It has a hollow region 14 delimited by a peripheral rim 16.

The covering sheet 2 held on the holding element 4 is inserted in the hollow region 14. The shape of the holding element 4 is such that a docking surface 18 of the covering sheet 2 extending as far as the edge 3 comes substantially into contact with the peripheral rim 16. The edge 3 of the covering sheet 2, which edge is located at the end of the docking surface 18, is thus embedded in the hollow region 14.

As illustrated, the holding element 4 may have a substantially concave or substantially flat curved cross-section, depending on the shape of the support element 10.

Foam is then introduced into a cavity 22 extending between the support element 10 and the complex 20. The strength of the holding element 4 is such that it does not become substantially deformed during the filling of the cavity 22 under the effect of the pressure of the injected foam.

The docking surface 18, which is kept bearing against the peripheral rim 16 of the support element 10 by the holding element 4, ensures that the cavity 22 is leak-tight, thus preventing the foam from escaping between the complex 20 and the support element 10.

The article 1 obtained is then removed from the mould. It comprises the support element 10, a "show" surface 24 of which is partially covered by an insert 26 of the covering element and a layer of foam 28 interposed between the insert 26 and the support element 10.

Figure 3:
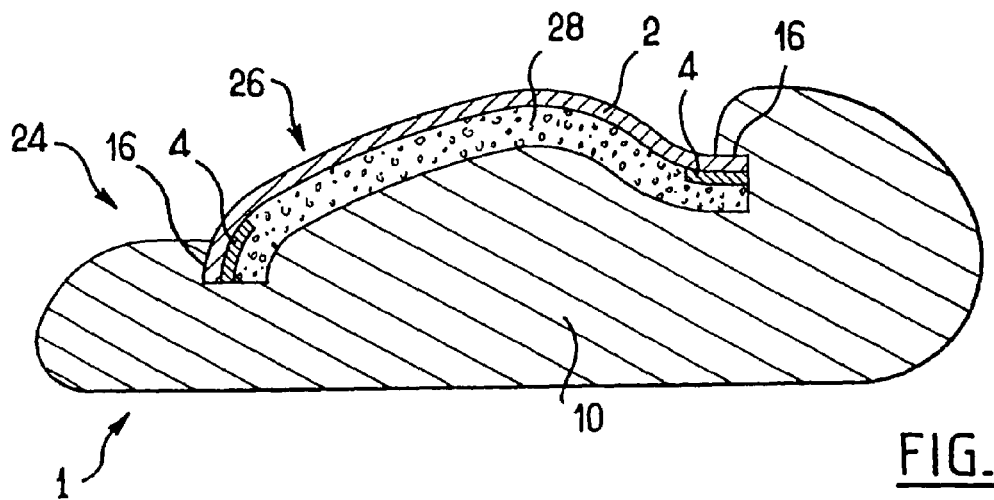

FIGS. 4 and 5 illustrate two steps of a process variant for manufacturing a complex 120. Elements corresponding to those illustrated in FIGS. 1 to 3 have a reference increased by 100.

FIG. 4 illustrates a covering sheet 102, similar to the covering sheet 2 but substantially larger, and a holding element 104 similar to the holding element 4, but substantially flat and thermoformable.

The holding element 104 is softened by a heating element 130, and then the holding element 104 is introduced with the covering element 102 into a thermoforming mould 132, as illustrated in FIG. 5. The holding element 104 is then shaped in the thermoforming mould and, simultaneously, a marginal region 108 of the covering sheet 102 is connected by thermo-adhesive bonding to the holding element 104.

As illustrated in FIG. 4, since the covering sheet 2 is not produced from a thermoformable material, the said covering sheet 2 is shaped before being introduced into the thermoforming mould 132, for example by assembling (by stitching) developable elements.

FIGS. 4 and 5 also illustrate a sealing film 105 which is heated by the heating element 130 at the same time as the holding element 104 and then interposed between the covering sheet 102 and the holding element 104 in the thermoforming mould 132.

The sealing film 105 prevents the foam from passing through the covering sheet during the foaming operation illustrated in FIG. 2. It is independent of the process, the choice to use it being a function only of the porosity of the covering element. Consequently, it is optional in the arrangement illustrated in FIGS. 4 and 5 and could have been interposed between the covering sheet 2 and the holding element 4 in the arrangement illustrated in FIGS. 1 to 3. The sealing film 105 may be constituted by a non-woven, a plastics film, a fine layer of foam or the like.

After removal from the thermoforming mould 132, the complex 120 comprising the covering sheet 102, the sealing film 105 and the holding element 104 is cut to the desired dimensions and then introduced into the foaming mould 12 illustrated in FIG. 2 as described above.

FIG. 6 illustrates the fact that it is possible to restrict camouflaging to one portion only 203a of the peripheral edge 203 of the covering element 202. The elements corresponding to those illustrated in FIGS. 1 to 3 have a reference increased by 200.

The holding element 204 constitutes an open frame, which is in this case substantially U-shaped. It supports a portion 208a of the marginal region 208 of the covering sheet 202. The remainder 208b of the marginal region 208 comes into contact with the support element 210, outside the hollow region 214. During the introduction of the foam into the cavity 222 of the mould 212, all of the marginal region 208 is thus held.

The non-camouflaged portion 203b of the peripheral edge 203 of the covering sheet 202 extending here along the edge of the "show" surface 224 will then be concealed beneath a screen, for example a glove compartment.

It will be appreciated that the invention is not in any way limited to the embodiment which has just been described by way of non-limiting example. Thus, it would be possible to provide that the holding element and the sealing film be produced as a single unitary piece, for example by moulding, the holding element being obtained directly in the desired shape for holding the covering in the mould or having to be shaped beforehand.

I claim:

1. Process for the manufacture of an article comprising a rigid support element of which a "show" face is partially covered by a supple covering, the process comprising the following steps:

connecting the covering to a relatively rigid holding element having its own shape and a strength such that it is not substantially deformed under predetermined foaming conditions, in order substantially to maintain the covering in a predetermined shape, placing the support element and the covering connected to the holding element in a foaming mould and, since the support element has a hollow region delimited by a peripheral rim, disposing a docking surface of the covering opposite the peripheral rim, introducing foam into the mould, between the support element and the covering, under the predetermined conditions, in order to connect the covering and the support element, wherein the holding element is thermoformable, and:

the covering is connected to the holding element and, simultaneously, the holding element is thermoformed, in order to confer on the covering the predetermined shape, then the docking surface of the covering is placed opposite the peripheral rim of the support element, in the foaming mould.

2. Process according to claim 1, wherein the covering is connected to the holding element only locally, at the periphery of the covering.

3. Process for the manufacture of an article comprising a rigid support element of which a "show" face is partially covered by a supple covering, the process comprising the following steps:

forming a complex by connecting the face of the covering opposed to said show face to a relatively rigid holding element having its own shape and a strength such that it is not substantially deformed under predetermined foaming conditions, in order substantially to maintain the covering in a predetermined shape, placing the support element and the complex in a foaming mould and, since the support element has a hollow region delimited by a peripheral rim, disposing a docking surface of the covering opposite the peripheral rim, introducing foam into the mould, between the support element and the complex, under the predetermined conditions, in order to connect the covering and the support element.

4. Process according to claim 3, wherein the covering is connected to the holding element only at the periphery of the covering.

5. Process according to claim 3, wherein the holding element is thermoformable, and:
- the covering is connected to the holding element and, simultaneously, the holding element is thermoformed, in order to confer on the covering the predetermined shape,
- then the docking surface of the covering is placed opposite the peripheral rim of the support element, in the foaming mould.

6. Process according to claim 3, wherein the holding element is manufactured substantially in accordance with the predetermined shape, and then the covering is connected to the holding element.

7. Process for the manufacture of an article comprising a rigid support element of which a show face is partially covered by a supple covering, the process comprising the following steps:
- forming a complex by connecting a face of the covering opposed to a show face to a relatively rigid thermoformable holding element having its own shape and a strength such that it is not substantially deformed under predetermined foaming conditions, in order substantially to maintain the covering in a predetermined shape,
- placing the support element and the complex in a foaming mould and, since the support element has a hollow region delimited by a peripheral rim, disposing a docking surface of the covering opposite the peripheral rim,
- introducing foam into the mould, between the support element and the complex, under the predetermined conditions, in order to connect the covering and the support element.

8. Process according to claim 7, wherein,
- the covering is connected to the holding element and, simultaneously, the holding element is thermoformed, in order to confer on the covering the predetermined shape.

9. Process according to claim 8, wherein, after the holding element is thermoformed, the docking surface of the covering is placed opposite the peripheral rim of the support element, in the foaming mould.

10. Process according to claim 7, wherein the covering is connected to the holding element only locally, at the periphery of the covering.

11. Process according to claim 7, wherein the covering is connected to the holding element only at the periphery of the covering.

12. Process according to claim 7, wherein the holding element is manufactured substantially in accordance with the predetermined shape, and then the covering is connected to the holding element.

13. Process according to claim 8, wherein the covering is connected to the holding element only locally, at the periphery of the covering.

14. Process according to claim 8, wherein the covering is connected to the holding element only at the periphery of the covering.

15. Process according to claim 9, wherein the covering is connected to the holding element only locally, at the periphery of the covering.

16. Process according to claim 9, wherein the covering is connected to the holding element only at the periphery of the covering.

17. Process according to claim 1, wherein the covering is connected to the holding element at the periphery of the covering and not in a central portion.

* * * * *